United States Patent
Punreddy et al.

(10) Patent No.: US 11,977,926 B1
(45) Date of Patent: May 7, 2024

(54) DEPLOYMENT OF POD COHORTS

(71) Applicant: MICROSOFT TECHNOLOGY LICENSING, LLC, Redmond, WA (US)

(72) Inventors: Ajay Punreddy, Cambridge, MA (US); Piotr Galecki, Lexington, MA (US); Dinesh Kumar Ramasamy, Chicago, IL (US); Thuy Phuong Fernandes, Westford, MA (US); Huanglin Xiong, Dover, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/214,488

(22) Filed: Jun. 26, 2023

(51) Int. Cl.
*G06F 9/50* (2006.01)

(52) U.S. Cl.
CPC .......... *G06F 9/5072* (2013.01); *G06F 9/5055* (2013.01)

(58) Field of Classification Search
CPC .................. G06F 9/5072; G06F 9/5055
See application file for complete search history.

(56) References Cited

U.S. PATENT DOCUMENTS

| | | | | |
|---|---|---|---|---|
| 11,025,495 B1* | 6/2021 | Bhatnagar | ............... | G06F 11/34 |
| 11,768,713 B2* | 9/2023 | Vishwanath | .......... | H04L 47/762 |
| | | | | 718/105 |
| 2014/0201218 A1* | 7/2014 | Catalano | ............... | H04L 47/803 |
| | | | | 707/748 |
| 2017/0322989 A1* | 11/2017 | Tran | .................... | G06F 11/3476 |
| 2020/0117616 A1* | 4/2020 | Parker | ................. | G06F 12/1441 |
| 2021/0240540 A1* | 8/2021 | Wang | .................. | G06F 9/45558 |
| 2021/0334678 A1* | 10/2021 | Abelha Ferreira | .... | G06N 20/00 |
| 2022/0255916 A1* | 8/2022 | Smith | .................. | H04L 9/3247 |
| 2023/0004436 A1* | 1/2023 | Bai | ........................ | G06F 9/5033 |
| 2023/0101973 A1* | 3/2023 | Mariappan | ............ | G06F 9/5022 |
| | | | | 719/328 |
| 2023/0300086 A1* | 9/2023 | Ivanov | .................. | H04L 47/762 |
| | | | | 709/226 |
| 2023/0419659 A1* | 12/2023 | Uljanovs | ................... | G06T 7/62 |

FOREIGN PATENT DOCUMENTS

JP          2023057535 A          4/2023

OTHER PUBLICATIONS

"Placing pods relative to other pods using affinity and anti-affinity rules", Retrieved from: https://docs.openshift.com/container-platform/4.9/nodes/scheduling/nodes-scheduler-pod-affinity.html, Retrieved Date: May 2, 2023, 12 Pages.

Dhande, Mayur, "Migration of VM based deployment to Kubernetes", Retrieved from: https://www.gslab.com/blogs/migration-of-vm-to-kubernetes/, Retrieved Date: May 2, 2023, 10 Pages.

* cited by examiner

*Primary Examiner* — Dhairya A Patel

(74) *Attorney, Agent, or Firm* — Han Gim; Newport IP, LLC

(57) ABSTRACT

Techniques are described for orchestrating a cohort deployment in a computing network comprising a plurality of computing nodes implementing a virtualized computing network managed by an orchestrator. The cohort deployment is managed by a deployment broker configured to coordinate the cohort deployment. The cohort deployment includes multiple deployments, where the cohort deployment comprises a parent deployment and a spawned deployment that includes a dependency on the parent deployment.

20 Claims, 6 Drawing Sheets

DEPLOYMENT OF POD COHORTS

BACKGROUND

Service providers can provide computing services to businesses and individuals as a remote computing service or provide "software as a service" (e.g., cloud computing). Many platforms use Kubernetes as a container orchestration system for application deployment, scaling, and management. In some cases, new products and services can be deployed, or deployed products and services from service providers may be updated. The products and services are often deployed over multiple sites, which can make the deployment complex and time-consuming. Furthermore, the updates may have overlapping scope, making it difficult for the operator to manage and implement such updates. Such complexities can result in various issues resulting in deployment delays, which in turn can prevent users of the service provider from providing services to their downstream users. This can lead to lost revenue and customer dissatisfaction.

It is with respect to these considerations and others that the disclosure made herein is presented.

SUMMARY

The disclosed embodiments describe technologies for complex orchestration of multiple simultaneous Kubernetes deployments that are required to work together in some manner such as sharing external resources and following common lifecycles. Independently of using Kubernetes Custom Resources, the disclosure provides a way for Kubernetes to monitor the instantiation of a parent deployment and spawn a workload of deployments that work in conjunction with the parent deployment to form a cohort. The controller then manages the spawned deployments and ensures that the spawned deployments adhere to the lifecycle of the parent deployment.

The disclosed embodiments enable an operator, for example, to avoid having to keep track of or reconfigure configuration changes which are in process when new changes need to be introduced. For example, an update may be rolled out at multiple sites across a region, during which an external resource needs to be changed due to an urgency such as a security issue. The current deployment may then need to be paused to accommodate the intervening change. This will require the operator who initiated the current deployment to determine the impacts to the deployments across the multiple sites, while reconfiguring the current rollout as needed to address the intervening change. However, the original intent of the overall current deployment does not change. By monitoring and managing the spawned deployments and ensuring that the spawned deployments adhere to the lifecycle of the parent deployment, the operator can be shielded from a significant amount of detailed configuration and reconfiguration effort. The disclosed embodiments enable the generation of the detailed deployment specifications, where the operator can confirm the generated deployment specifications to proceed with a deployment.

In an embodiment, a new Kubernetes management layer is implemented that provides a set of services that allows for life cycle management of the deployment of a cohort of services that are intended to be deployed together. This cohort management layer can be used to manage a complex deployment, modifications to the complex deployment, and termination of the complex deployment.

The described techniques can allow for a service provider or user to more efficiently deploy and manage computing resources while maintaining efficient use of computing capacity such as processor cycles, memory, network bandwidth, and power.

This Summary is provided to introduce a selection of concepts in a simplified form that are further described below in the Detailed Description. This Summary is not intended to limit the scope of the claimed subject matter.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
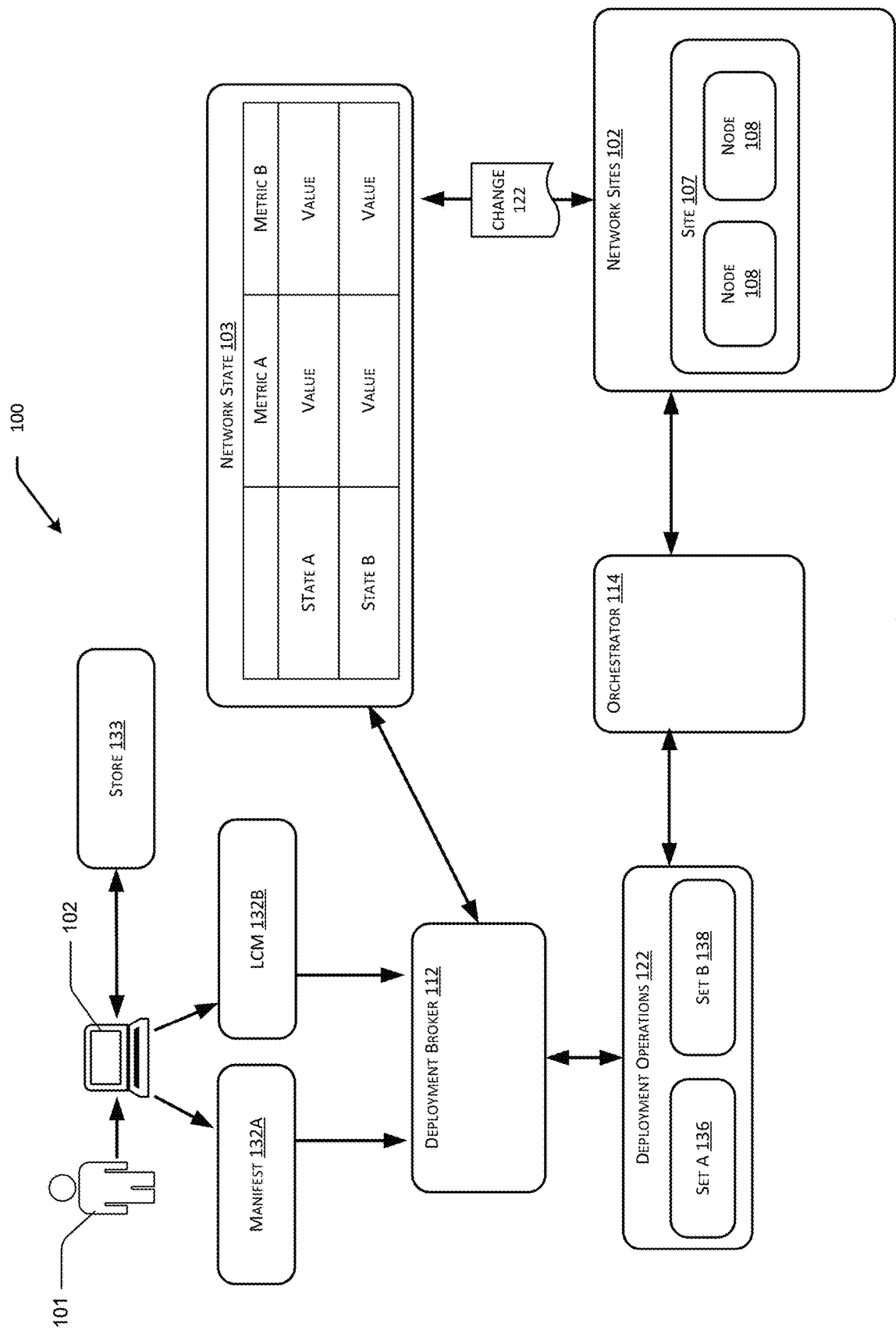
FIG. 1 is a diagram illustrating an example architecture in accordance with the present disclosure.

Kubernetes is widely used to orchestrate deployment and management of complex containerized functions. However, native Kubernetes capabilities are limited to the management of singular deployments. For example, control plane applications can interoperate with resources using Kubernetes services and ConfigMaps. For data plane applications where there are two or more deployments that rely on common external resources, it is difficult and labor intensive to detect and manage these interdependencies. For example, if a deployment has a singular external resource, and it is desired to create multiple micro-services where each micro-service employs different detection and enforcement functions related to the resource, then it is difficult for Kubernetes to manage these deployments which are interrelated but exist on network boundaries outside existing Kubernetes services.

The disclosed embodiments describe technologies for efficiently describing, allocating, or creating various resources related to deploying software updates across a plurality of sites in a distributed network. In particular, the disclosed embodiments provide for complex orchestration of multiple simultaneous Kubernetes deployments that are required to work together in some manner such as sharing external resources and following common lifecycles. Independently of using Kubernetes Custom Resources, the disclosure provides a way for the Kubernetes controller to monitor the instantiation of a parent deployment and spawn a workload of deployments that work in conjunction with the parent deployment to form a cohort. The parent deployment is multi-dimensional and each parent deployment has its own managed cohort that adheres to the lifecycle of the parent. The controller then manages the spawned deployments and ensures that the spawned deployments adhere to the lifecycle of the parent deployment.

More generally, a new Kubernetes management layer is implemented that provides a set of services that allows for life cycle management of the deployment of a cohort of services that are intended to be deployed together. This cohort management layer can be used to manage a complex deployment, modifications to the complex deployment, and termination of the complex deployment. As used herein, the cohort management layer may be referred to as a deployment broker in example embodiments. The cohort management layer or deployment broker receives information for a desired complex deployment, ensures that there are sufficient resources available to support the complex deployment such as compute resources and memory. The cohort management layer or deployment broker provides real time feedback as to whether a specified complex deployment is deployable, prior to the user attempting to deploy the complex deployment. If the specified complex deployment is not deployable, the specified complex deployment can be modified or canceled. If the specified complex deployment is to proceed, the cohort management layer or deployment broker ensures that any external dependencies and resources are reserved and allocated to the individual deployments and workloads of the complex deployment.

The examples illustrated herein are described using Kubernetes, but the disclosed embodiments can be implemented with other orchestration systems for cloud deployments. The disclosed embodiments include a cohort management layer or deployment broker that provides a set of services that allows for life cycle management of the deployment of a cohort of services that are intended to be deployed together. The cohort management layer or deployment broker monitors the instantiation of a parent deployment and extracts key lifecycle parameters of the parent deployment.

The cohort management layer or deployment broker receives a definition of a complex deployment that requires multiple deployments that share at least some of the lifecycle parameters as well as shared resources for the complex deployment. The cohort management layer or deployment broker ensures that there are sufficient resources available to support the complex deployment such as compute resources and memory. The cohort management layer provides real time feedback as to whether a specified complex deployment is deployable, prior to the user attempting to deploy the complex deployment. If the specified complex deployment is not deployable, the specified complex deployment can be modified or canceled. If the specified complex deployment is to proceed, the cohort management layer or deployment broker ensures that any external dependencies and resources are reserved and allocated to the individual deployments and workloads of the complex deployment.

Based on the definition, the lifecycle parameters, and the shared resources, the cohort management layer or deployment broker spawns a workload of deployments that work in conjunction with the parent deployment to form a cohort. The cohort management layer or deployment broker manages the spawned deployments (the cohort) and ensures that the cohort adheres to the lifecycle parameters of the parent deployment. The cohort management layer or deployment broker manages modifications to the complex deployment and termination of the complex deployment.

The disclosed embodiments provide for the features implemented by the cohort deployment to be safe (e.g., avoids crashes, loss of functionality, etc.) and visible (e.g., allowing operators to view status of the deployment), while allowing the operator to maintain control over the cohort deployment using a mechanism that allows for the operator's inputs to be focused on overall deployment and deployment objectives rather than specific coordination and monitoring actions pertaining to what, where, and how a complex cohort is to be deployed.

In one embodiment, the cohort management layer or deployment broker provides an interface that enables an operator to set the desired state of the system to effect a complex cohort. The cohort management layer or deployment broker automatically creates a scenario of how the complex cohort is to be propagated, and which set of actions to apply to safely deploy the cohort.

The cohort management layer or deployment broker, based on the input information received, generates details for deploying the cohort. In an embodiment, the details for deploying the cohort can include a step-by-step guide of how to deploy the cohort to the applicable data centers/regions.

In one embodiment, the cohort management layer or deployment broker is part of a system for orchestrating a deployment to a network. The system for orchestrating the deployment can be implemented on one or more servers in a data center. In an embodiment, the network comprises at least two computing nodes, which can include servers, clusters of servers, deployments within a data center, and the like, and network devices such as gateways. The cohort deployment is represented by at least one configuration which indicates the desired state of the network.

In an embodiment, one or more policies can be referenced or accessed, from which optimal and permitted changes to the network can be derived. In an embodiment, at least one central element or node in the network is configured to access the current state of the network. The central element or node combines the configuration and policy with the current state of the network and generates a series of discrete steps to update the network, reserve resources, and other tasks so as to configure the network to deploy the cohort indicated by the information received from the user.

The central element or node may host the cohort management layer or deployment broker as described further herein. The central element or node is configured to run multiple iterations if the network changes. The scope of the network changes can vary. For example, the central element or node can orchestrate changes of varied scope, where multiple devices such as servers can be affected for full or partial deployments and across multiple data centers and edge sites. As further described herein, the cohort management layer or deployment broker receives statements and policies relevant to a desired deployment in the form of a manifest. The cohort management layer or deployment broker converts the manifest to generate the set of steps that are to be applied to execute the deployment. The operator can run the cohort management layer or deployment broker multiple times for a given manifest. Each time that the cohort management layer or deployment broker is executed for a given manifest, the generated steps can change depending on if the central element or node has identified any changes to the network that impact the desired deployment. The cohort management layer or deployment broker process can be rerun as needed. In some alternative embodiments, the cohort management layer or deployment broker can be implemented as a continuous running agent.

In an example, the manifest can be provided as a JavaScript Object Notation (JSON) file that defines parameters that indicate the current state, the desired state, and applicable policies. The cohort management layer or deployment broker can generate a set of declarative steps by reading the manifest and implement the manifest when generating the declarative steps, for example policies pertaining to timing requirements, health checks, and deployment scenarios. Deployment scenarios can include initial deployment zones for a canary deployment, and whether rollout to zones is to be performed serially or in parallel.

In an embodiment, the operator can stop a deployment in progress and regenerate/restart the deployment. During the regeneration process, the cohort management layer or deployment broker determines what actions have already been implemented. The cohort management layer or deployment broker uses the manifest and policy as well as the current state to regenerate the deployment process and deployment the rollout process, from a different starting point if needed. In this way, the operator can stop a deployment, implement other changes to the system as a whole, and still be able to track the underlying intent of the deployment. This can be beneficial, for example, if a resource is updated and it is desired to incorporate a version that includes the updated resource. In an embodiment, a consistency check of the computing network may be performed to verify that the deployment can be effected in the network without conflicts or incompatibilities.

The intent of the deployment can be updated while maintaining the original deployment without the updated resource. Thus, the cohort management layer or deployment broker allows for the deployment to be evolved to include changes during the deployment process, enabling the operator to specify deployment objectives without specifying individual low-level changes in the network. The cohort management layer or deployment broker, using information received from the central element or node, uses the latest information regarding the topology of the network, including the various components that are to be updated, the configuration of the servers and edge zones, and network conditions as informed by policies are constraints such as delays, health checks, canary deployments, and deployment sequence.

FIG. 1 illustrates an example computing environment 100 that implements a way to deploy a cohort deployment comprising a parent deployment and a spawned deployment, in an embodiment. An operator 101 inputs details for the cohort to a system managed by orchestrator 114 by inputting a manifest via a computing device 102 that is indicated by manifest 132A. Other input can be included such as life cycle management (LCM) 132B and network state 103. In an embodiment, aspects of the manifest 132A and life cycle management (LCM) 132B may be selected from a store 133 of previously created and saved components. The deployment as indicated by the manifest 132A specifies what complex cohort is desired, what sites 107 are to be affected, and what set of policies and rules are to be followed. In an embodiment, the intent can be represented in a configuration file. The configuration can include a policy indicative of constraints for changes that are permitted in the network and a current state of the network. As used herein, the cohort management layer may also be referred to as a deployment broker 112. The cohort management layer (deployment broker 112 as shown in FIG. 1) then uses the manifest 132A to determine how the deployment will be propagated and which set of actions to apply in order to safely implement the deployment. The deployment is generated as a set of deployment operations 122 that can include set A 136 and set B 138 and provides a step-by-step guide of how to implement the deployment to each of the affected regions such as site 107, which in this example includes nodes 108. In some embodiments, the deployment broker 112 can include a mapping component configured to translate the manifest 132A to the deployment operations 122.

Figure 2:
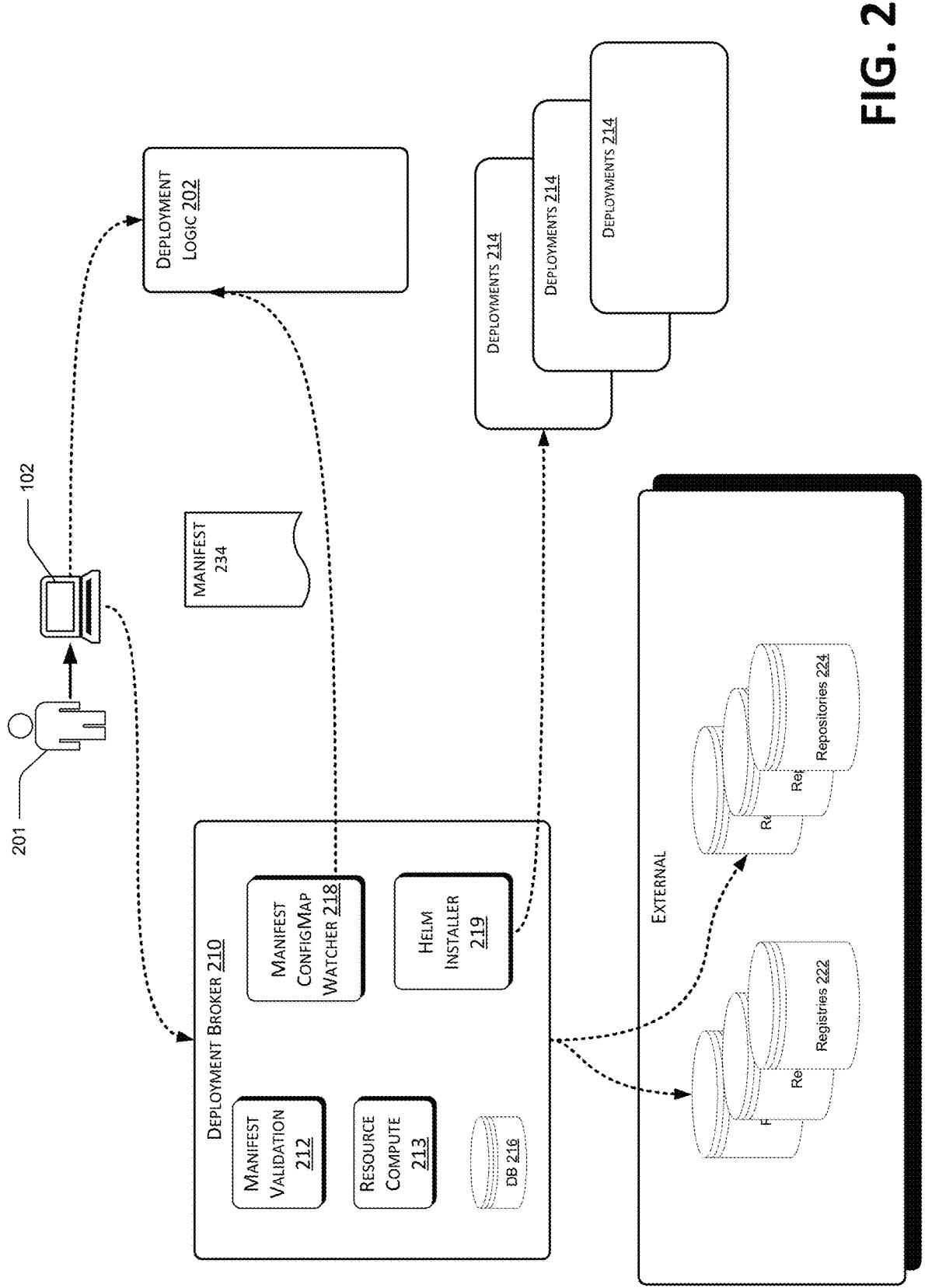
FIG. 2 is a diagram illustrating an example architecture in accordance with the present disclosure.

An example detailed process illustrating the disclosed embodiments is described below and illustrated in FIG. 2. In an embodiment, the Kubernetes custom resource definition (CRD) is not used due to requirements for what the user has to provide and update for a cohort deployment. When a cohort deployment is to be deployed by a user 201, a set of deployment logic 202 is defined. In an embodiment, a manifest 234 is generated that includes user specific information. Manifest 234 contains information of the desired deployment as a Kubernetes ConfigMap, in one embodiment. The deployment broker 210 monitors for deployments that are annotated for custom installation and validation. In some embodiments, a deployment broker pod provides at least some of the described functionality.

A manifest validation 212 is performed for the resources that are desired for the deployment. This includes validating that the content of the manifest can be realized based on, for example, the CPU and memory resources 213 that is requested. If the validation passes, then broker deployment 210 saves information into a database 216 so that if there is a future upgrade to the logic, the deployment broker 210 can review the database 216 for cross checking and ensuring that the delta deployment is realized. In this way, if an upgrade is desired and additional resources are needed, then data for the previous deployment is available for comparison.

For deployment logic 202 for a desired network function or a software as a service, a set of deployments 214 is defined that can include Helm charts as well as related external repositories 224 and image registries 222. The deployment logic 202 is deployed and an annotation is applied to the deployment logic 202. A given user can have several layers of logic deployment spanning different groups within an enterprise, where each group can deploy their own logic. There is one deployment broker 210 that monitors the annotations for each deployment and ensures consistency.

To realize a set of deployments according to an embodiment, the deployment broker 210 queries the deployment logic 202 if the logic is annotated. An initialization routine is performed that returns what manifest is to be used in the form of a Config Map. The deployment logic 202 returns a manifest identity and a manifest watcher 218 reads the Config Map and watches for further changes.

The deployment broker 210 validates the manifest 234. This includes verifying that the external repositories 224 can be reached and that all of the images 222 can be obtained. The deployment broker 210 validates the values supplied in the Helm charts and the CPU and memory requested in the manifest 234. The deployment broker 210 analyzes the cluster information in the Kubernetes environment and ensures that all the resources being requested are available. Depending on if resources being requested are not available, the broker sends a notification indicating that the request is accepted or rejected. A rejection indicates that the requested deployment cannot be realized and the user is notified that the requested deployment is rejected. If the validation is successful, then the deployment can proceed starts with Helm installation by Helm installer 219.

A sequential deployment order for the manifest 234 is determined and external resources are allocated such as obtaining or accessing database resources or external server connectivity if needed to deploy an application. Deployment then proceeds and when successful, a notification is provided.

Lifecycle management of the deployments is provided by the deployment broker 210. The deployment logic 202 is now decoupled from the packaging and managing of the deployment. The deployment broker 210 will continue to provide notifications on a communication channel from the deployment broker 210. The deployment broker will continue to monitor all services to ensure that the services are all up and sends a notification that the desired deployment is implemented.

When modifications are desired to the deployment and an updated manifest is needed, the deployment broker reviews the updated manifest, reviews what is stored in the database, and apply any delta changes or services that are needed. A summary of an example process is provided below.

STEP 1: User inputs desired deployments
  a. Deployment Broker
    i. Monitors for deployments that are annotated for custom installation and validation
STEP 2:
  a. Logic Deployment
    i. Provides a manifest of the desired deployment as ConfigMap
STEP 3:
  a. Broker pod monitors the presence of one or more deployments that have the annotations
  b. Calls the deployment logic with a API endpoint/initialize
  c. deployment logic responds back with a manifest ConfigMap and callback function/notify for future notifications of the progress of life cycle management (LCM) of the deployment logic
STEP 4:
  a. Reads the manifest
    i. Manifest contains
      1. List of HELM charts
        a. Which have information to access
          i. Docker registries
          ii. Helm repositories
      2. Custom values for each of the HELM charts
      3. Order of deployment and termination of HELM charts
STEP 5: Validation by Deployment Broker
  a. Validates the manifest
  b. Performs memory and CPU computation and checks to see if the desired deployment is feasible
  c. Notifies on the notify channel that it has ACCEPTED or REJECTED the manifest
STEP 6:
  a. if ACCEPTED starts the HELM installation and periodically notifies the deployment logic of the progress
  b. Saves the state of the deployment in its database and notifies of SUCCESS
  c. Creates a WATCHER on any upgrades to the manifest and notifies with ACCEPTED/REJECTED and upgrades the deployment
STEP 7: Deployment broker upon receiving a SUCCESS notification
  a. Starts its own LCM process to make sure that all the desired services are UP
STEP 8:
  a. Notifies the USER that Desired Deployment is READY for service In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provides federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 3:
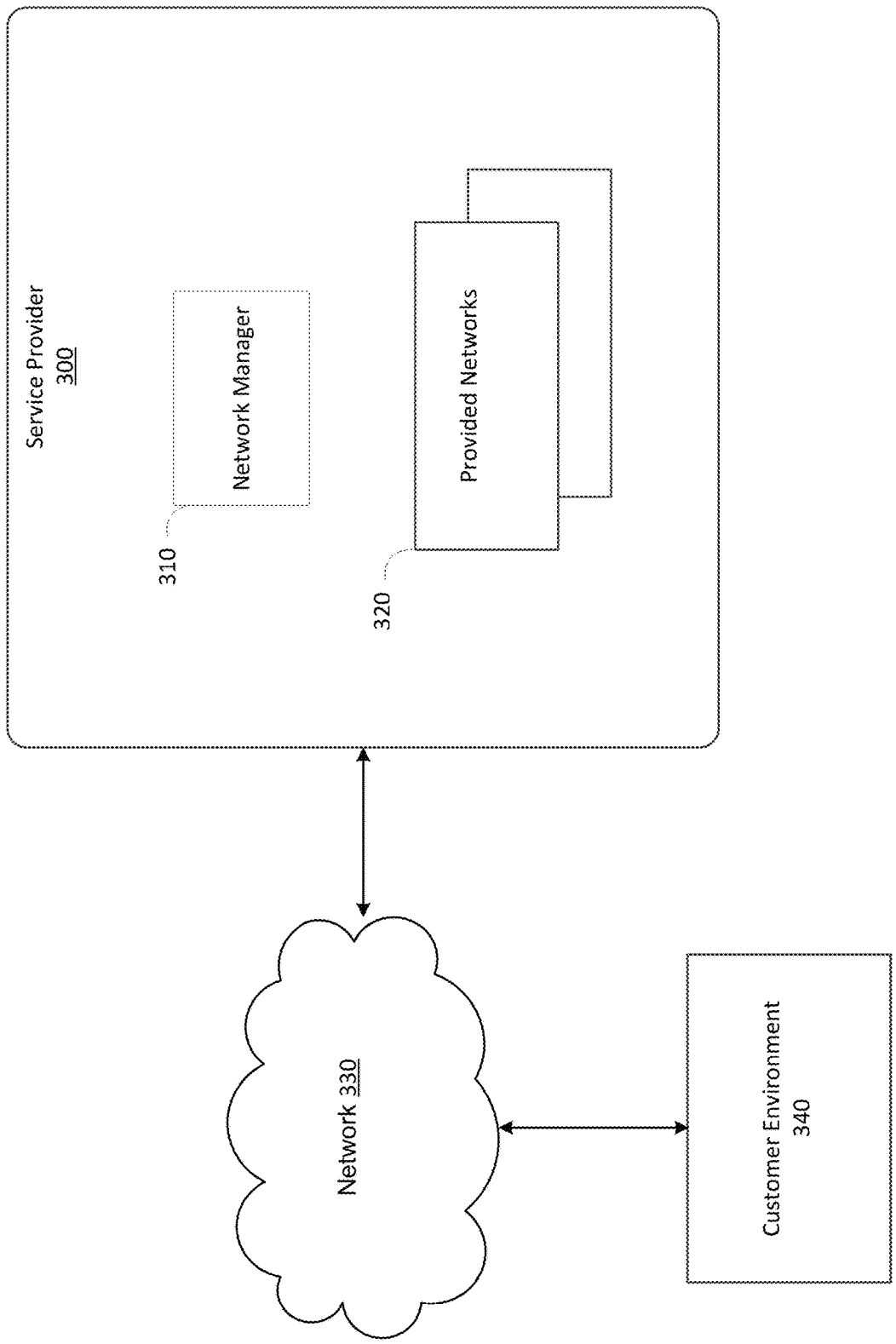
FIG. 3 is a diagram illustrating an example architecture in accordance with the present disclosure.

FIG. 3 illustrates an example computing environment in which the embodiments described herein may be implemented. FIG. 3 illustrates a service provider 300 that is configured to provide computing resources to users at customer environment 340. The customer environment 340 may have user computers that may access services provided by service provider 300 via a network 330. The computing resources provided by the service provider 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like.

Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor). Networking resources may include virtual networking, software load balancer, and the like. The virtual machines may be configured to execute applications, including Web servers, application servers, media servers, database servers, and the like. Data storage resources may include file storage devices, block storage devices, and the like.

Service provider 300 may have various computing resources including servers, routers, and other devices that may provide remotely accessible computing and network resources using, for example, virtual machines. Other resources that may be provided include data storage resources. Service provider 300 may also execute functions that manage and control allocation of network resources, such as a network manager 330. Various services can be provided via provided networks 320.

Network 330 may, for example, be a publicly accessible network of linked networks and may be operated by various entities, such as the Internet. In other embodiments, network 330 may be a private network, such as a dedicated network that is wholly or partially inaccessible to the public. Network 330 may provide access to computers and other devices at the customer environment 310.

The disclosed embodiments may be implemented in a mobile edge computing (MEC) environment implemented in conjunction with a 3G, 5G, or other cellular network. The MEC environment may include at least some of the components and functionality described in FIGS. 1 and 2 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

It should be appreciated that although the embodiments disclosed above are discussed in the context of virtual machines, other types of implementations can be utilized with the concepts and technologies disclosed herein. It should be also appreciated that the network topology illustrated in FIG. 3 has been greatly simplified and that many more networks and networking devices may be utilized to interconnect the various computing systems disclosed herein. These network topologies and devices should be apparent to those skilled in the art.

Figure 4:
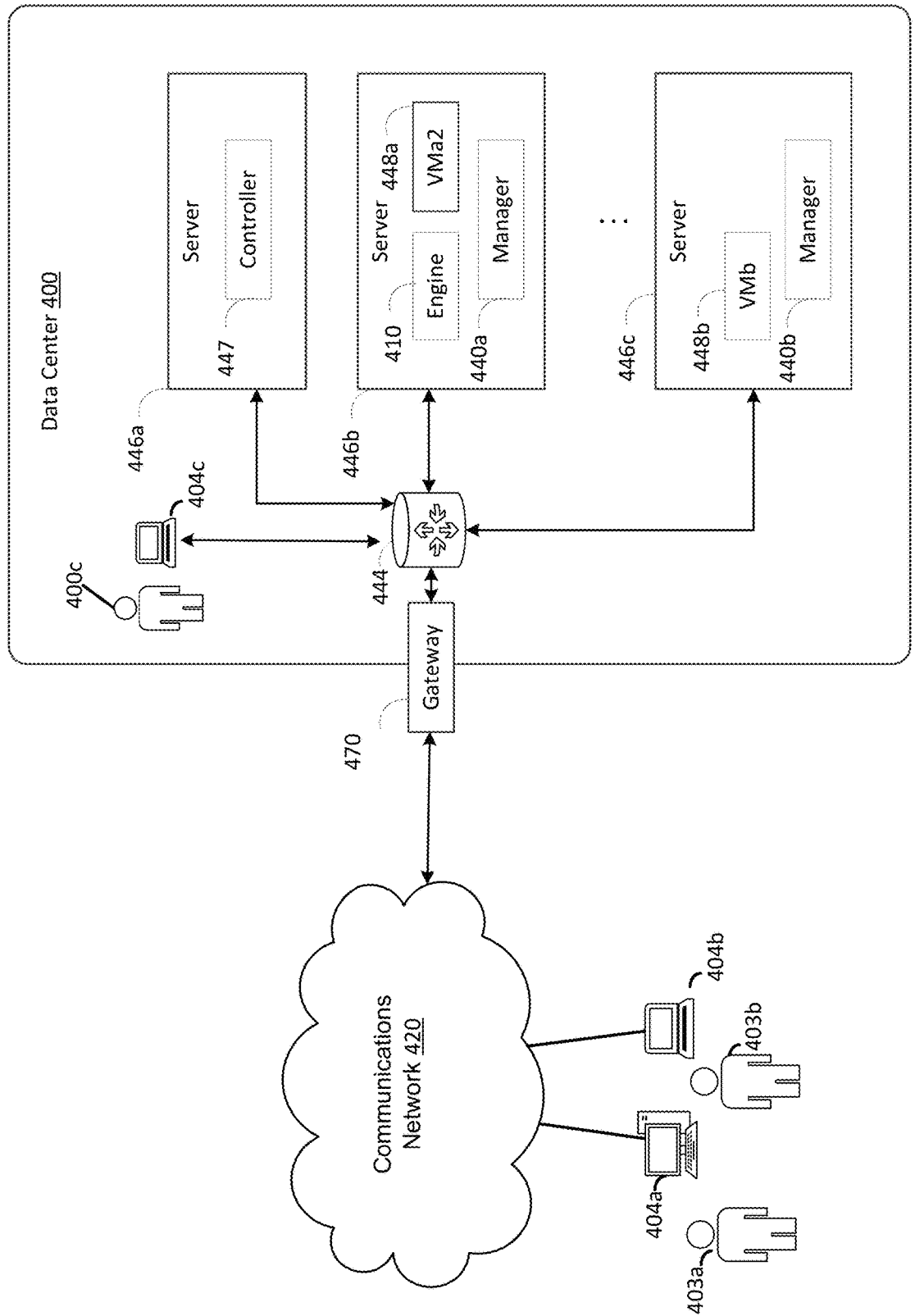
FIG. 4 is a diagram illustrating an example architecture in accordance with the present disclosure.

FIG. 4 illustrates an example computing environment in which the embodiments described herein may be implemented. FIG. 4 illustrates a data center 400 that is configured to provide computing resources to users 403*a*, 403*b*, or 403*c* (which may be referred herein singularly as "a user 403" or in the plural as "the users 403") via user computers 404*a*, 404*b*, and 404*c* (which may be referred herein singularly as "a computer 404" or in the plural as "the computers 404") via a communications network 420. The computing resources provided by the data center 400 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 400 may correspond service provider 300 of FIG. 4. Data center 400 may include servers 446*a*, 446*b*, and 446*c* (which may be referred to herein singularly as "a server 446" or in the plural as "the servers 446") that may be standalone or installed in server racks, and provide computing resources available as virtual machines 448*a* and 448*b* (which may be referred to herein singularly as "a virtual machine 448" or in the plural as "the virtual machines 448"). The virtual machines 448 may be configured to execute applications such as Web servers, application servers, media servers, database servers, and the like. Other resources that may be provided include data storage resources (not shown on FIG. 4) and may include file storage devices, block storage devices, and the like. Servers 446 may also execute functions that manage and control allocation of resources in the data center, such as a controller 447. Controller 447 may be a fabric controller or another type of program configured to manage the allocation of virtual machines on servers 446. In an embodiment, a rollout management engine 410 as described herein may be implemented in server 446*b*.

Referring to FIG. 4, communications network 420 may, for example, be a publicly accessible network of linked networks and may be operated by various entities, such as the Internet. In other embodiments, communications network 420 may be a private network, such as a corporate network that is wholly or partially inaccessible to the public.

Communications network 420 may provide access to computers 404. Computers 404 may be computers utilized by users 403. Computer 404*a*, 404*b* or 404*c* may be a server, a desktop or laptop personal computer, a tablet computer, a smartphone, a set-top box, or any other computing device capable of accessing data center 400. User computer 404*a* or 404*b* may connect directly to the Internet (e.g., via a cable modem). User computer 404*c* may be internal to the data center 400 and may connect directly to the resources in the data center 400 via internal networks. Although only three user computers 404*a*, 404*b*, and 404*c* are depicted, it should be appreciated that there may be multiple user computers.

Computers 404 may also be utilized to configure aspects of the computing resources provided by data center 400. For example, data center 400 may provide a Web interface through which aspects of its operation may be configured through the use of a Web browser application program executing on user computer 404. Alternatively, a stand-alone application program executing on user computer 404 may be used to access an application programming interface (API) exposed by data center 400 for performing the configuration operations.

Servers 446 may be configured to provide the computing resources described above. One or more of the servers 446 may be configured to execute a manager 440*a* or 440*b* (which may be referred herein singularly as "a manager 440" or in the plural as "the managers 440") configured to execute the virtual machines. The managers 440 may be a virtual machine monitor (VMM), fabric controller, or another type of program configured to enable the execution of virtual machines 448 on servers 446, for example.

It should be appreciated that although the embodiments disclosed above are discussed in the context of virtual machines, other types of implementations can be utilized with the concepts and technologies disclosed herein.

In the example data center 400 shown in FIG. 4, a network device 444 may be utilized to interconnect the servers 446*a* and 446*b*. Network device 444 may comprise one or more switches, routers, or other network devices. Network device 444 may also be connected to gateway 470, which is connected to communications network 420. Network device 444 may facilitate communications within networks in data center 400, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5:
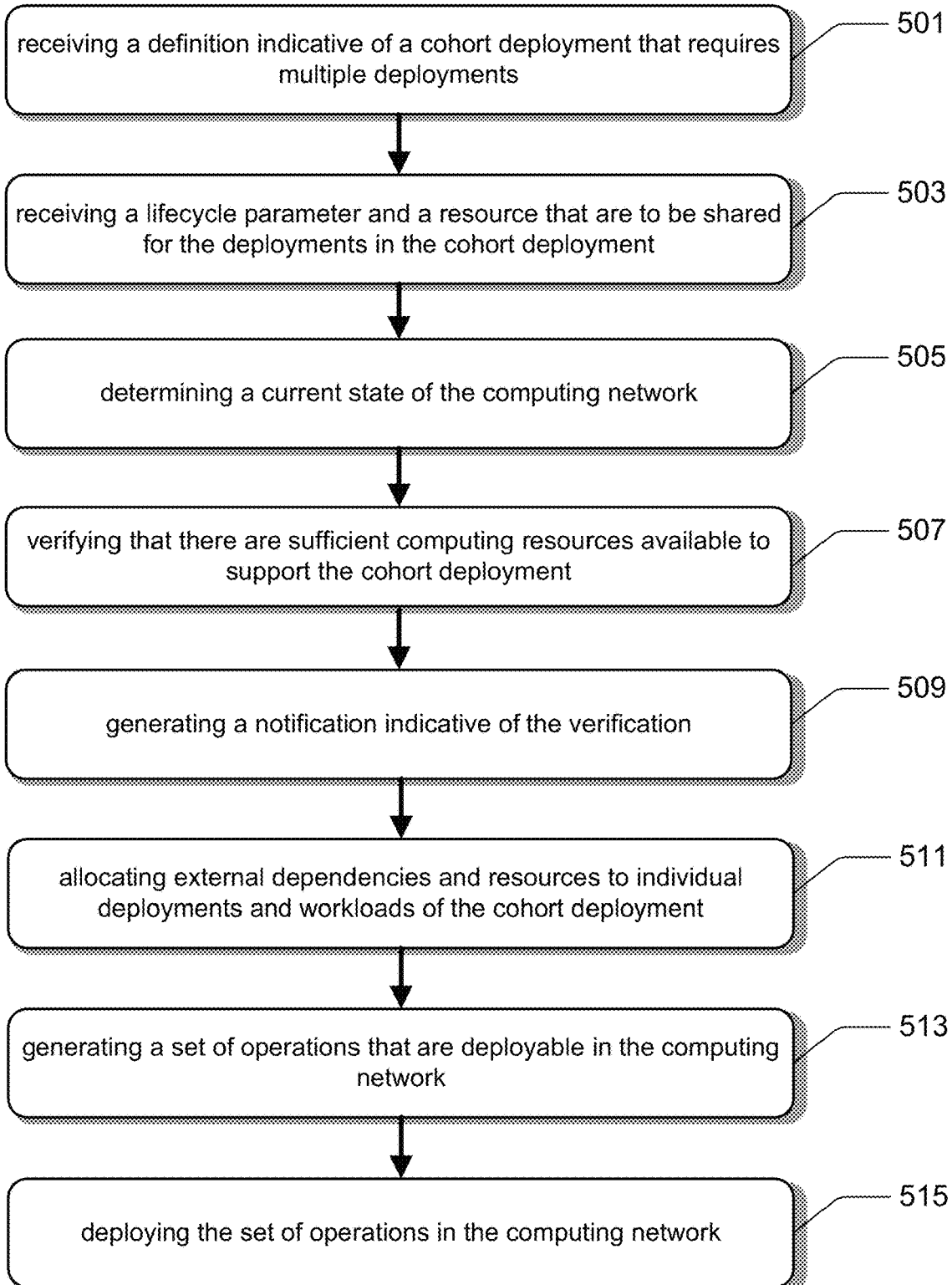
FIG. 5 is a flowchart depicting an example procedure in accordance with the present disclosure.

Turning now to FIG. 5, illustrated is an example operational procedure 500 for orchestrating a cohort deployment in a computing network comprising a plurality of computing nodes implementing a virtualized computing network managed by an orchestrator. The cohort deployment is managed by a deployment broker configured to coordinate the cohort deployment. Such an operational procedure can be provided by one or more components illustrated in FIGS. 1 through 4. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

Referring to FIG. 5, operation 501 illustrates receiving a definition indicative of a cohort deployment that requires multiple deployments. In an embodiment, the cohort deployment comprises a parent deployment and a spawned deployment that includes a dependency on the parent deployment. Operation 503 illustrates receiving a lifecycle parameter and a resource that are to be shared for the deployments in the cohort deployment. Operation 505 illustrates determining a current state of the computing network.

Operation 507 illustrates verifying that there are sufficient computing resources available to support the cohort deployment. Operation 509 illustrates generating a notification indicative of the verification. Operation 511 illustrates allocating external dependencies and resources to individual deployments and workloads of the cohort deployment. Operation 513 illustrates based on the lifecycle parameter, shared resource, a current state of the computing network, and verification that there are sufficient computing resources, generating a set of operations that are deployable in the computing network. In an embodiment, the set of operations configure the computing network to deploy the cohort deployment.

Operation 515 illustrates deploying the set of operations in the computing network.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine is described as running on a system, it can be appreciated that the routine and other operations described herein can be executed on an individual computing device or several devices.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 6:
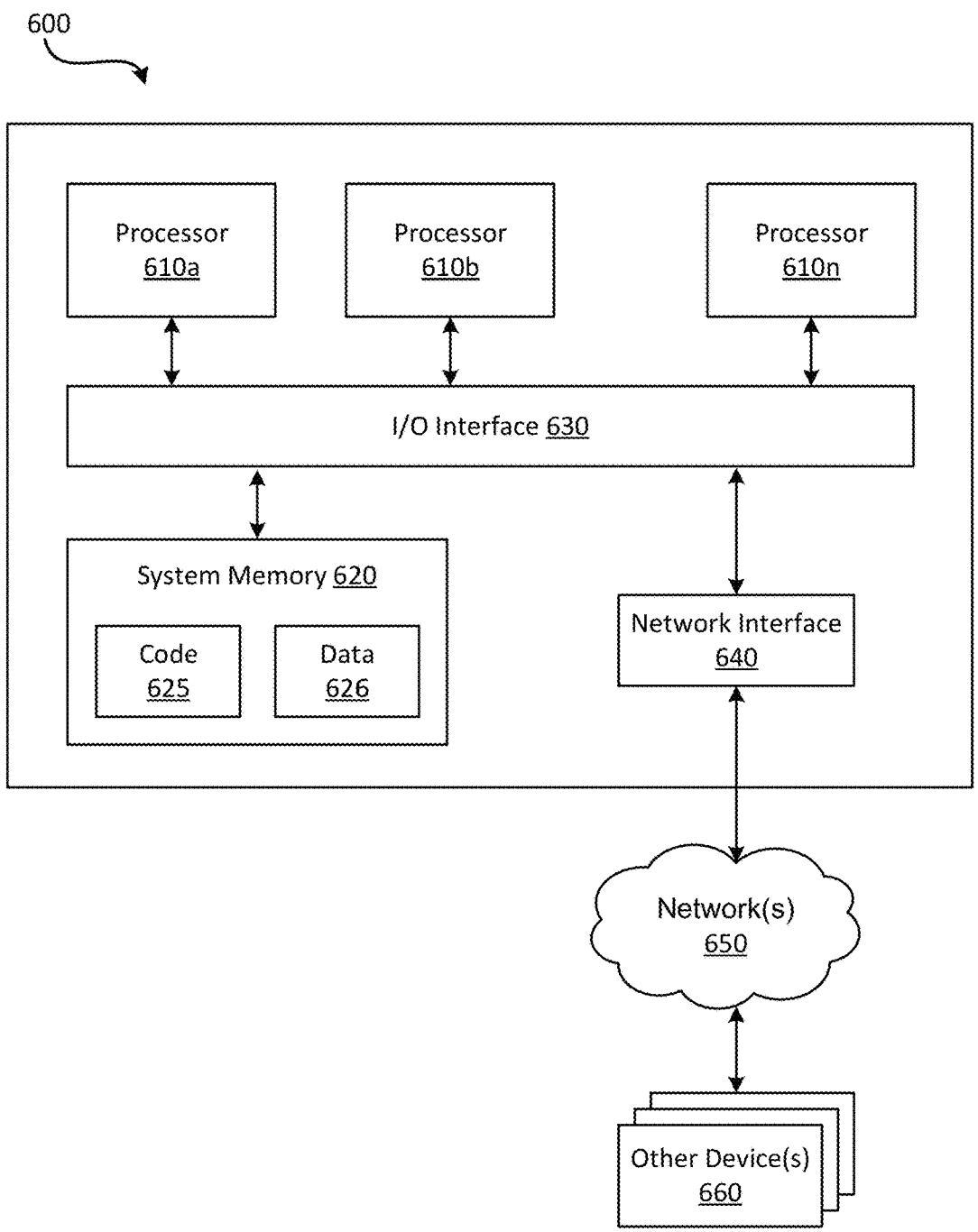
FIG. 6 is an example computing system in accordance with the present disclosure.

FIG. 6 illustrates a general-purpose computing device 600. In the illustrated embodiment, computing device 600 includes one or more processors 610*a*, 610*b*, and/or 610*n* (which may be referred herein singularly as "a processor 610" or in the plural as "the processors 610") coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x66, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between the processor 610, system memory 620, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or network(s) 650, such as other computer systems or devices as illustrated in FIGS. 1 through 5, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 6, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method of orchestrating a cohort deployment in a computing network comprising a plurality of computing nodes implementing a virtualized computing network managed by an orchestrator, the cohort deployment managed by a deployment broker configured to coordinate the cohort deployment, the method comprising:
  receiving a definition indicative of a cohort deployment that requires multiple deployments, wherein the cohort deployment comprises a parent deployment and a spawned deployment that includes a dependency on the parent deployment;
  receiving a lifecycle parameter and a resource that are to be shared for the deployments in the cohort deployment;
  determining a current state of the computing network;
  verifying that there are sufficient computing resources available to support the cohort deployment;
  generating a notification indicative of the verification;
  allocating external dependencies and resources to individual deployments and workloads of the cohort deployment;
  based on the lifecycle parameter, shared resource, the current state of the computing network, and verification that there are sufficient computing resources, generating a set of operations that are deployable in the computing network, wherein the set of operations configure the computing network to deploy the cohort deployment; and
  deploying the set of operations in the computing network.

Clause 2: The method of clause 1, wherein the computing resources comprise memory, CPU, or storage.

Clause 3: The method of any of clauses 1-2, further comprising ensuring that individual deployments of the cohort deployment adhere to the lifecycle parameter of the cohort deployment.

Clause 4: The method of any of clauses 1-3, further comprising terminating the cohort deployment.

Clause 5: The method of any of clauses 1-4, further comprising performing a consistency check of the computing network.

Clause 6: The method of any of clauses 1-5, further comprising receiving a change to the definition indicative of the cohort deployment;

in response to receiving the change to the definition indicative of the cohort deployment, pausing the deployment of the set of operations in the computing network;

based on the change to the definition indicative of the cohort deployment, updating the set of operations to achieve the change to the definition; and deploying the updated set of operations in the computing network.

Clause 7: The method of clauses 1-6, wherein the generating the set of operations comprises resolving dependencies between the definition and resources in the computing network.

Clause 8: The method of any of clauses 1-7, wherein the definition comprises a manifest.

Clause 9: The method of any of clauses 1-8, wherein the change is received after some of the set of operations have been executed.

Clause 10: A system comprising:
one or more processors; and
a memory in communication with the one or more processors, the memory having computer-readable instructions stored thereupon that, when executed by the one or more processors, cause the system to perform operations comprising:

receiving a lifecycle parameter and a resource that are to be shared for the deployments in the cohort deployment;

determining a current state of a computing network where the cohort deployment is to be deployed;

verifying that there are sufficient computing resources available to support the cohort deployment;

allocating external dependencies and resources to individual deployments and workloads of the cohort deployment;

based on the lifecycle parameter, shared resource, a current state of the computing network, and verification that there are sufficient computing resources, generating a set of operations that are deployable in the computing network, wherein the set of operations configure the computing network to deploy the cohort deployment; and deploying the set of operations in the computing network.

Clause 11: The system of clause 10, further comprising computer-readable instructions that, when executed by the one or more processors, cause the system to perform operations comprising:

ensuring that individual deployments of the cohort deployment adhere to the lifecycle parameter of the cohort deployment.

Clause 12: The system of any of clauses 10 and 11, further comprising computer-readable instructions stored thereupon that, when executed by the one or more processors, cause the system to perform operations comprising terminating the cohort deployment.

Clause 13: The system of any clauses 10-12, further comprising computer-readable instructions stored thereupon that, when executed by the one or more processors, cause the system to perform operations comprising:

receiving a change to the definition indicative of the cohort deployment;

in response to receiving the change to the definition indicative of the cohort deployment, pausing the deployment of the set of operations in the computing network;

based on the change to the definition indicative of the cohort deployment, updating the set of operations to achieve the change to the definition; and deploying the updated set of operations in the computing network.

Clause 14: The system of any clauses 10-13, wherein the generating the set of operations comprises resolving dependencies between the definition and resources in the computing network.

Clause 15: The system of any clauses 10-14, wherein the definition comprises a manifest.

Clause 16: The system of any clauses 10-15, wherein the change is received after some of the set of operations have been executed.

Clause 17: The system of any clauses 10-16, further comprising computer-readable instructions stored thereupon that, when executed by the one or more processors, cause the system to perform operations comprising performing a consistency check of the computing network.

Clause 18: A computer-readable storage medium having computer-executable instructions stored thereupon which, when executed by one or more processors of a system, cause the system to perform operations comprising:

receiving a definition indicative of a cohort deployment that requires multiple deployments, wherein the cohort deployment comprises a parent deployment and a spawned deployment that includes a dependency on the parent deployment;

receiving a lifecycle parameter and a resource that are to be shared for the deployments in the cohort deployment;

determining a current state of a computing network where the cohort deployment is to be deployed;

verifying that there are sufficient computing resources available to support the cohort deployment;

allocating external dependencies and resources to individual deployments and workloads of the cohort deployment;

based on the lifecycle parameter, shared resource, a current state of the computing network, and verification that there are sufficient computing resources, generating a set of operations that are deployable in the computing network, wherein the set of operations configure the computing network to deploy the cohort deployment; and deploying the set of operations in the computing network.

Clause 19: The computer-readable storage medium of clause 18, further comprising computer-readable instructions that, when executed by the one or more processors, cause the system to perform operations comprising:

ensuring that individual deployments of the cohort deployment adhere to the lifecycle parameter of the cohort deployment.

Clause 20: The computer-readable storage medium of any of clauses 18 and 19, further comprising computer-readable instructions that, when executed by the one or more processors, cause the system to perform operations comprising:

receiving a change to the definition indicative of the cohort deployment;

in response to receiving the change to the definition indicative of the cohort deployment, pausing the deployment of the set of operations in the computing network;

based on the change to the definition indicative of the cohort deployment, updating the set of operations to achieve the change to the definition; and deploying the updated set of operations in the computing network.

The invention claimed is:

1. A method of orchestrating a cohort deployment in a computing network comprising a plurality of computing nodes implementing a virtualized computing network managed by an orchestrator, the cohort deployment managed by a deployment broker configured to coordinate the cohort deployment, the method comprising:
    receiving a definition indicative of a cohort deployment that requires multiple deployments, wherein the cohort deployment comprises a parent deployment and a spawned deployment that includes a dependency on the parent deployment;
    receiving a lifecycle parameter and a resource that are to be shared for the deployments in the cohort deployment;
    determining a current state of the computing network;
    verifying that there are sufficient computing resources available to support the cohort deployment;
    generating a notification indicative of the verification;
    allocating external dependencies and resources to individual deployments and workloads of the cohort deployment;
    based on the lifecycle parameter, shared resource, the current state of the computing network, and verification that there are sufficient computing resources, generating a set of operations that are deployable in the computing network, wherein the set of operations configure the computing network to deploy the cohort deployment; and
    deploying the set of operations in the computing network.

2. The method of claim 1, wherein the computing resources comprise memory, CPU, or storage.

3. The method of claim 1, further comprising ensuring that individual deployments of the cohort deployment adhere to the lifecycle parameter of the cohort deployment.

4. The method of claim 1, further comprising terminating the cohort deployment.

5. The method of claim 1, further comprising performing a consistency check of the computing network.

6. The method of claim 1, further comprising receiving a change to the definition indicative of the cohort deployment;
    in response to receiving the change to the definition indicative of the cohort deployment, pausing the deployment of the set of operations in the computing network;
    based on the change to the definition indicative of the cohort deployment, updating the set of operations to achieve the change to the definition; and
    deploying the updated set of operations in the computing network.

7. The method of claim 1, wherein the generating the set of operations comprises resolving dependencies between the definition and resources in the computing network.

8. The method of claim 1, wherein the definition comprises a manifest.

9. The method of claim 6, wherein the change is received after some of the set of operations have been executed.

10. A system comprising:
    one or more processors; and
    a memory in communication with the one or more processors, the memory having computer-readable instructions stored thereupon that, when executed by the one or more processors, cause the system to perform operations comprising:
        receiving a definition indicative of a cohort deployment that requires multiple deployments, wherein the cohort deployment comprises a parent deployment and a spawned deployment that includes a dependency on the parent deployment;
        receiving a lifecycle parameter and a resource that are to be shared for the deployments in the cohort deployment;
        determining a current state of a computing network where the cohort deployment is to be deployed;
        verifying that there are sufficient computing resources available to support the cohort deployment;
        allocating external dependencies and resources to individual deployments and workloads of the cohort deployment;
        based on the lifecycle parameter, shared resource, a current state of the computing network, and verification that there are sufficient computing resources, generating a set of operations that are deployable in the computing network, wherein the set of operations configure the computing network to deploy the cohort deployment; and
        deploying the set of operations in the computing network.

11. The system of claim 10, further comprising computer-readable instructions that, when executed by the one or more processors, cause the system to perform operations comprising:
    ensuring that individual deployments of the cohort deployment adhere to the lifecycle parameter of the cohort deployment.

12. The system of claim 10, further comprising computer-readable instructions stored thereupon that, when executed by the one or more processors, cause the system to perform operations comprising terminating the cohort deployment.

13. The system of claim 10, further comprising computer-readable instructions stored thereupon that, when executed by the one or more processors, cause the system to perform operations comprising:
    receiving a change to the definition indicative of the cohort deployment;
    in response to receiving the change to the definition indicative of the cohort deployment, pausing the deployment of the set of operations in the computing network;
    based on the change to the definition indicative of the cohort deployment, updating the set of operations to achieve the change to the definition; and
    deploying the updated set of operations in the computing network.

14. The system of claim 10, wherein the generating the set of operations comprises resolving dependencies between the definition and resources in the computing network.

15. The system of claim 10, wherein the definition comprises a manifest.

16. The system of claim 13, wherein the change is received after some of the set of operations have been executed.

17. The system of claim 16, further comprising computer-readable instructions stored thereupon that, when executed by the one or more processors, cause the system to perform operations comprising performing a consistency check of the computing network.

18. A computer-readable storage medium having computer-executable instructions stored thereupon which, when executed by one or more processors of a system, cause the system to perform operations comprising:

receiving a definition indicative of a cohort deployment that requires multiple deployments, wherein the cohort deployment comprises a parent deployment and a spawned deployment that includes a dependency on the parent deployment;

receiving a lifecycle parameter and a resource that are to be shared for the deployments in the cohort deployment;

determining a current state of a computing network where the cohort deployment is to be deployed;

verifying that there are sufficient computing resources available to support the cohort deployment;

allocating external dependencies and resources to individual deployments and workloads of the cohort deployment;

based on the lifecycle parameter, shared resource, a current state of the computing network, and verification that there are sufficient computing resources, generating a set of operations that are deployable in the computing network, wherein the set of operations configure the computing network to deploy the cohort deployment; and deploying the set of operations in the computing network.

19. The computer-readable storage medium of claim 18, further comprising computer-readable instructions that, when executed by the one or more processors, cause the system to perform operations comprising:

ensuring that individual deployments of the cohort deployment adhere to the lifecycle parameter of the cohort deployment.

20. The computer-readable storage medium of claim 18, further comprising computer-readable instructions that, when executed by the one or more processors, cause the system to perform operations comprising:

receiving a change to the definition indicative of the cohort deployment;

in response to receiving the change to the definition indicative of the cohort deployment, pausing the deployment of the set of operations in the computing network;

based on the change to the definition indicative of the cohort deployment, updating the set of operations to achieve the change to the definition; and deploying the updated set of operations in the computing network.

* * * * *